(12) United States Patent
Sun et al.

(10) Patent No.: US 12,553,778 B2
(45) Date of Patent: Feb. 17, 2026

(54) BUSHING TEMPERATURE DETECTING SYSTEM OF MACHINE ASSEMBLY

(71) Applicant: Zibo Yiyuan Engineering and Technology Co., Ltd., Zibo (CN)

(72) Inventors: Yongkong Sun, Zibo (CN); Zhangqin Pu, Zibo (CN); Limin Miao, Zibo (CN); Xiaotao Zheng, Zibo (CN)

(73) Assignee: ZIBO YIYUAN ENGINEERING AND TECHNOLOGY CO., LTD., Zibo (CN)

( * ) Notice: Subject to any disclaimer, the term of this patent is extended or adjusted under 35 U.S.C. 154(b) by 594 days.

(21) Appl. No.: 18/067,816

(22) Filed: Dec. 19, 2022

(65) Prior Publication Data

US 2024/0201019 A1    Jun. 20, 2024

(51) Int. Cl.
| | |
|---|---|
| *G01K 1/14* | (2021.01) |
| *H01R 13/512* | (2006.01) |
| *H01R 13/516* | (2006.01) |
| *H01R 13/52* | (2006.01) |
| *H01R 13/58* | (2006.01) |
| *H01R 13/73* | (2006.01) |

(52) U.S. Cl.
CPC .............. *G01K 1/14* (2013.01); *H01R 13/512* (2013.01); *H01R 13/516* (2013.01); *H01R 13/5202* (2013.01); *H01R 13/5804* (2013.01); *H01R 13/73* (2013.01); *H01R 2201/20* (2013.01)

(58) Field of Classification Search
None
See application file for complete search history.

(56) References Cited

U.S. PATENT DOCUMENTS

2015/0153238 A1*  6/2015  Yang ..................... G01K 1/14
374/179

* cited by examiner

*Primary Examiner* — Erica S Lin
(74) *Attorney, Agent, or Firm* — HOWARD M COHN and Associates, LLC (57) ABSTRACT

A machine assembly bushing temperature detecting system is disclosed. The system includes multiple temperature measuring components, leads and oil resistance component separately connected with the temperature measuring components. The oil resistance component includes process connecting bolt, multi-point fixing piece, locking screws for connecting the process connecting bolt and the multi-point fixing piece. The locking screw is sleeved in the multi-point fixing piece. One end of the multi-point fixing piece is provided with convex structure. A compressing structure is provided in the locking screw to coordinate with the convex structure. The locking screw is in thread connection with the process connecting bolt. The compressing structure is moved away from or pressed against the convex structure by rotation of the locking screw relative to the process connecting bolt.

5 Claims, 7 Drawing Sheets

BUSHING TEMPERATURE DETECTING SYSTEM OF MACHINE ASSEMBLY

TECHNICAL FIELD

The disclosure relates to a bushing temperature detecting system of machine assembly.

BACKGROUND

The temperature detecting for bushing of oil-refining chemical enterprise, in large-scale machine set is a necessary part to ensure safety operation of machine, which requires safe and reliable, high certainty of measurement, and fast thermal response time.

Existing product defects are as follows.
1, The oil leak oil leakage problem of lead and connector causes machine assembly oil starvation and environmental pollution.
2, Multi-point mode displacement installation cannot be achieved, causing wiring layout unreasonable, constructional difficulties.
3, The reasonable arrangement of leads cannot achieve, which easily causes the impact injury of the abrasion and oil of components.

In view of the above shortcomings, the disclosure is designed, to research and innovation, and a machine assembly bushing temperature detecting system is disclosed.

SUMMARY

In order to solve the above technical problems, the object of the disclosure is to provide a machine assembly bushing temperature detecting system having reasonable arrangement of leads, which effectively avoid oil leaking through the leads.

The machine assembly bushing temperature detecting system includes several temperature measuring components, leads separately connected to the temperature measuring components and oil resistance component. The oil resistance component includes process connecting bolt, multi-point fixing piece, multi-point locking screw for connecting the process connecting bolt and the multi-point fixing piece. The compressing structure is moved away from or pressed against a convex structure by rotation of the locking screw relative to the process connecting bolt.

One end of the multi-point fixing piece is provided with a convex structure, the locking screw is provided with a compressing structure matching with the convex structure, and the locking screw is connected with the process connecting bolt by leads. The compressing structure is moved away from or pressed against the convex structure by rotation of the locking screw relative to the process connecting bolt.

A plurality of jacket through holes are arranged on the multi-point fixing piece, and an armor sealing sleeve is arranged in each of the jacket through holes, and the lead passes through the armor sealing sleeve. High temperature resistant sealant for sealing the lead in the armor sealing sleeve is arranged in the armor sealing sleeve.

The other end of the multi-point fixing piece is sleeved with a compressing screw. High temperature resistant O-shaped sealing ring are arranged between that outer wall of the armor sealing sleeve and the inner wall of the jacket through hole. The compressing screw compresses the high-temperature resistant O-shaped sealing ring through a compressing structure. The compressing structure includes a pressing column pressed on the O-shaped sealing ring and a pressing plate pressed on the pressing column.

Further, an O-ring blocking protrusion is arranged in the inner wall of the jacket through hole, and the O-shaped sealing ring is pressed on the O-ring blocking protrusion.

Further, the pressing plate is provided with a plurality of lead through holes, and the leads pass through the lead through holes.

Particularly, each lead is provided with a fixing clip for fixing the lead in the machine assembly.

Particularly, the process connecting bolt is connected to a process interface on the machine assembly.

According to the above aspects of the disclosure, the disclosure has at least the following advantages:

In the machine assembly bushing temperature detecting system, multiple leads are separately arranged through the multi-point fixing piece, the reasonable layout of single point and single line of temperature measuring points is realized, and the displacement and installation of temperature measuring points are solved, which avoids wear of components and damages caused by oil impacting. In the section of the armor sealing sleeve, the non-metallic insulation layer on the outside of the lead is strip to expose the metal lead, and then the armor sealing sleeve is sheathed, a high temperature resistant sealant is filled in the middle of the armor sealing sleeve. The purpose of maintaining the insulation of the metal lead inside the lead is achieved. The armor sealing sleeve only seals the metal lead inside the lead, which can prevent the grease inside the machine assembly from leaking to the outside through the non-metallic insulating material of the lead.

In order to clearly understand that technical schemes of the disclosure, the technical mean of the disclosure can be implemented in accordance with the content of the specification and the accompanying drawings.

DETAILED DESCRIPTION OF THE EMBODIMENTS

With reference to the accompanying drawings and examples, the specific implementation mode of the disclosure is described in further detail. The examples below are for illustrating the disclosure only and are not limited to the scope of the disclosure thereto.

As shown in FIGS. 1 to 7, the machine assembly bushing temperature detecting system includes several temperature measuring components 10. Each temperature measuring components is separately connected with several leads 8 and oil resistance component. The leads are equipped with the fixing clip 9 being fixed on lead in machine assembly.

The oil resistance component includes process connecting bolt 4, multi-point fixing piece 3, the locking screw 2 for connecting the process connecting bolt 4, and the multi-point fixing piece 3. The locking screw is set in the multi-point fixing piece.

One end of the multi-point fixing piece is provided with convex structure. A compressing structure is provided in the locking screw to coordinate with the convex structure. The locking screw is in thread connection with the process connecting bolt. The compressing structure is moved away from or pressed against the convex structure by rotation of the locking screw relative to the process connecting bolt.

A plurality of jacket through holes are arranged on the multi-point fixing piece, and an armor sealing sleeve 11 is arranged in each of the jacket through holes, and the lead passes through the armor sealing sleeve. High temperature resistant sealant for sealing the lead in the armor sealing sleeve is arranged in the armor sealing sleeve.

The other end of the multi-point fixing piece is sleeved with a compressing screw 1. High temperature resistant O-shaped sealing ring 7 are arranged between the outer wall of the armor sealing sleeve and the inner wall of the jacket through hole. The compressing screw compresses the high-temperature resistant O-shaped sealing ring through a compressing structure. The compressing structure includes a pressing column 6 pressed on the O-shaped sealing ring and a pressing plate 5 pressed on the pressing column.

In this embodiment, an O-ring blocking protrusion is arranged in the inner wall of the jacket through hole, and the O-shaped sealing ring is pressed on the O-ring blocking protrusion. The pressing plate is provided with a plurality of lead through holes, and the leads pass through the lead through holes.

Figure 1:
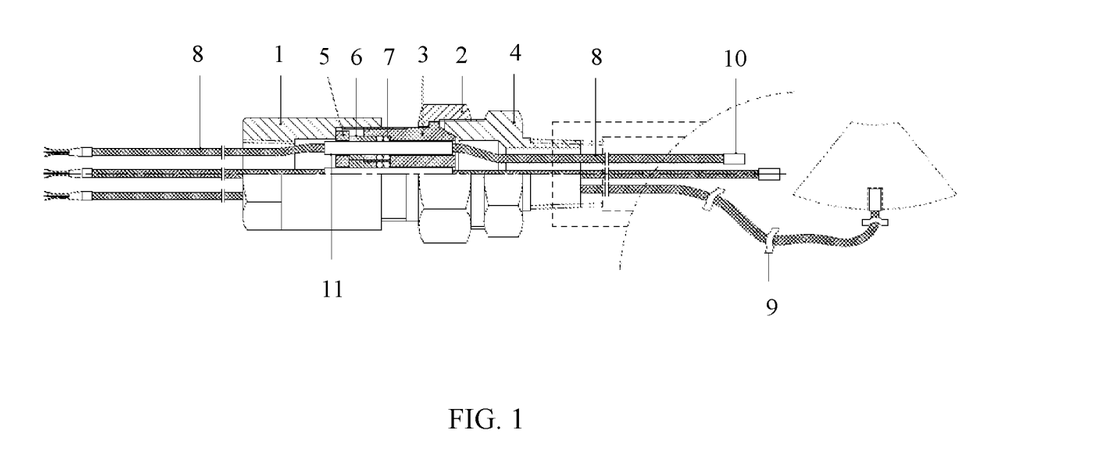
FIG. 1 is a structure diagram of the machine assembly bushing temperature detecting system in the disclosure.
Figure 2:
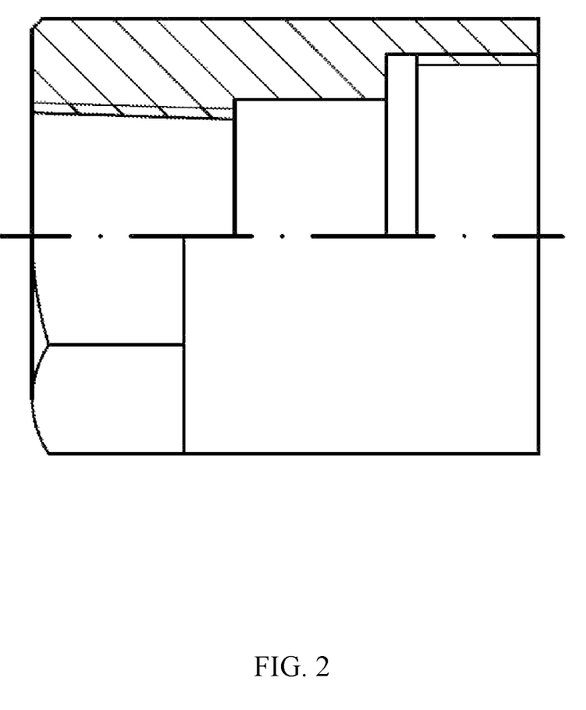
FIG. 2 is the half sectional view of the compressing screw of machine assembly bushing temperature detecting system of the disclosure.
Figure 3:
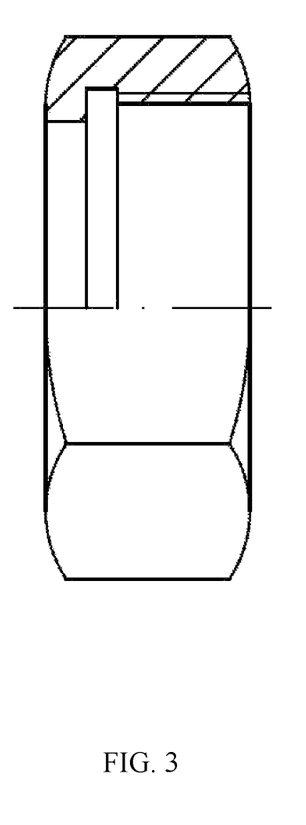
FIG. 3 is the half sectional view of the locking screw of machine assembly bushing temperature detecting system of the disclosure.
Figure 4:
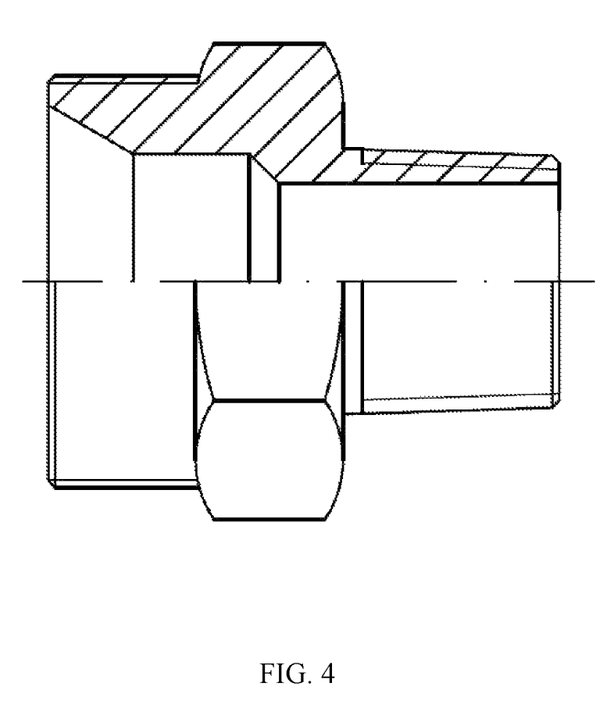
FIG. 4 is the half sectional view of the process connecting bolt of machine assembly bushing temperature detecting system of the disclosure.
Figure 5:
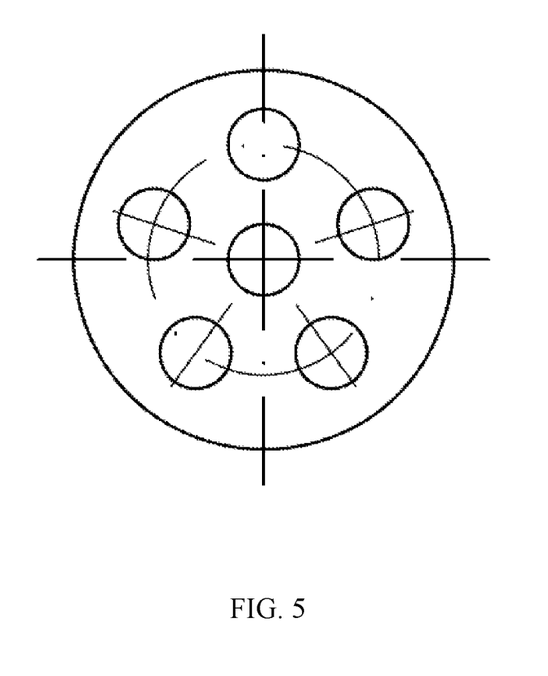
FIG. 5 is the half sectional view of the pressing plate of machine assembly bushing temperature detecting system of the disclosure.
Figure 6:
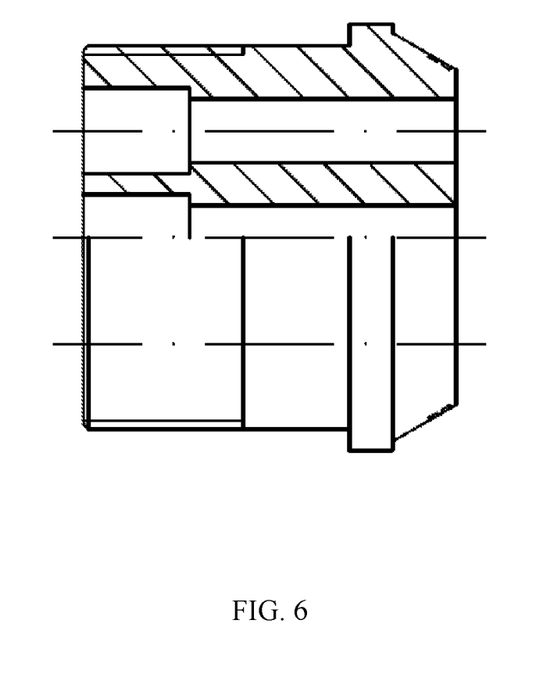
FIG. 6 is the half sectional view of the multi-point fixing piece of machine assembly bushing temperature detecting system of the disclosure.
Figure 7:
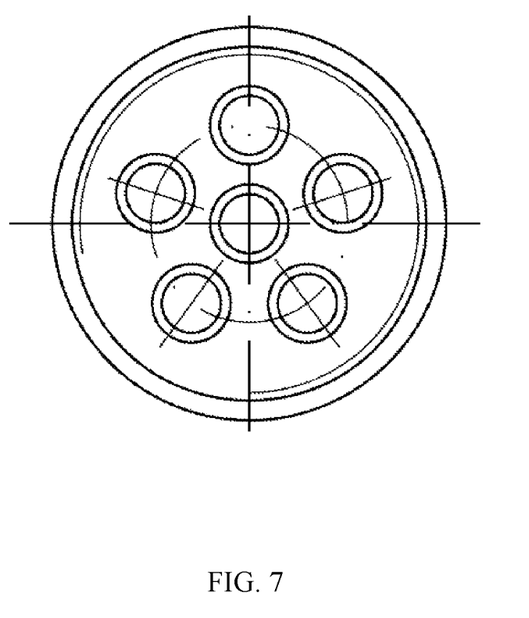
FIG. 7 is a side view of the multi-point fixing piece of machine assembly bushing temperature detecting system of the disclosure.

In the machine assembly bushing temperature detecting system of this embodiment, the temperature measuring component 10 is firstly inserted into the temperature measuring position in the machine assembly, and each lead 8 is reasonably arranged inside the machine assembly through the fixing clip 9, which avoids wear of internal components of the machine assembly and damages caused by oil impacting.

The leads pass through the process connecting bolt 4 and the process connecting bolt is tighten to the process interface on the machine assembly. The locking assembly 2 is inserted into the multi-point fixing piece 3 and the leads pass through the multi-point fixing piece, so that the armor sealing sleeve 11 is passed through the multi-point fixing piece.

The locking screw is tightened because the multi-point fixing piece and the process connecting bolt are connected by a movable locking screw so that twisting of the locking screw does not result in the stranding of the fixed leads installed inside the machine assembly. A surface seal between the multi-point fixing part and the process connecting bolt is adopted, which can be achieved by tightening the locking screw. The high-temperature resistant O-ring 7, the pressing column 6 and the pressing plate 5 are sequentially fitted into the armor sealing sleeve 11. The pressing screw 1 is connected with the multi-point fixing piece through the leads, and the pressing plate can be pressed with a balanced force by tightening the pressing screw, thereby pressing the high-temperature resistant O-ring to achieve the sealing effect.

In the above embodiment, the O-ring blocking protrusion is arranged in the inner wall of the lead through hole, and the O-ring is pressed on the O-ring blocking protrusion.

In the embodiment, the temperature measurement at 1 to 12 point(s) on the same machine assembly can be realized, the non-metallic insulate layer on the outer surface of the lead is peeled off in the section of the armor sealing sleeve, the metal lead is exposed, high-temperature resistant sealant is filled in the middle of the armoring seal sleeve to achieve the purpose of keeping the metal lead inside the lead insulated. Because of the limitation of the material itself, the non-metallic insulating layer outside the lead does not have a sealing effect, since the armor sealing sleeve 11 only seals the metallic lead inside the lead, therefore, the grease inside the machine assembly can be prevented from leaking to the outside through the nonmetallic insulating material of the eight leads.

The multi-point fixing piece and process connecting bolt 4 are connected by a movable 2 locking screw so that twisting the locking screw does not result in a stranded wire of the fixed lead wire installed inside the unit. There is a surface seal between the multi-point fixing piece and the process connecting bolt 4, which can be achieved by tightening the locking screw 2. The movable connection means can realize the multi-point displacement installation, make the lead arrangement, and realize the sealing effect. Balanced pressure release is realized by pressing the pressing plate to ensure the sealing between each armored sealing sleeve and multi-point fixing pieces.

Note that the high temperature described in the disclosure is the temperature at which the sealant and the O-ring can maintain normal use in a specific practical engineering application for a person skilled in the art, and is determined according to the specific actual situation.

The foregoing is merely a preferred embodiment of the present invention and is not intended to limit the present invention, but it should be noted that, to those skilled in the art, without departing from the technical principles of the present invention, A number of improvements and variations can be made, which should also be regarded as the scope of protection of the present invention.

What is claimed is:

1. A machine assembly bushing temperature detecting system, comprising a plurality of temperature measuring components, leads and oil resistance component separately connected with the plurality of temperature measuring components;

the oil resistance component comprises process connecting bolt, multi-point fixing piece, locking screws for connecting the process connecting bolt and the multi-point fixing piece; the locking screw is sleeved over the multi-point fixing piece;

one end of the multi-point fixing piece is provided with convex structure; a compressing structure is provided in the locking screw to coordinate with the convex structure; the locking screw is in thread connection with the process connecting bolt; the compressing structure is moved away from or pressed against the convex structure by rotation of the locking screw relative to the process connecting bolt;

a plurality of jacket through holes are arranged in the multi-point fixing piece, and an armor sealing sleeve is arranged in each of the jacket through holes, and the leads pass through the armor sealing sleeve; a high temperature resistant sealant for sealing the lead in the armor sealing sleeve is arranged in the armor sealing sleeve;

an other end of the multi-point fixing piece is sleeved with a compressing screw; a high temperature resistant O-shaped sealing ring is arranged between the outer wall of the armor sealing sleeve and the inner wall of the jacket through hole; the compressing screw compresses the high-temperature resistant O-shaped sealing ring through a compressing structure; the compressing structure comprises a pressing column pressed on the O-shaped sealing ring and a pressing plate pressed on the pressing column;

the temperature measuring components are firstly inserted into temperature measuring positions in the machine assembly, and each of the leads is arranged inside the machine assembly through the fixing clip;

the leads pass through the process connecting bolt and the process connecting bolt is tighten to the process interface on the machine assembly; the locking assembly is inserted into the multi-point fixing piece and the leads pass through the multi-point fixing piece, so that the armor sealing sleeve is passed through the multi-point fixing piece;

the locking screw is tightened because the multi-point fixing piece and the process connecting bolt are connected by a movable locking screw; a surface sealing between the multi-point fixing part and the process connecting bolt is achieved by tightening the locking screw; the O-shaped sealing ring, the pressing column and the pressing plate are sequentially fitted into the armor sealing sleeve; the pressing screw is connected with the multi-point fixing piece through the leads, and the pressing plate can be pressed with a balanced force by tightening the pressing screw.

2. The bushing temperature detecting system of claim 1, wherein an O-ring blocking protrusion is arranged in the inner wall of the lead through hole, and the O-ring is pressed on the O-ring blocking protrusion.

3. The bushing temperature detecting system of claim 1, wherein the pressing plate is provided with a plurality of lead through holes, and the leads pass through the lead through holes.

4. The bushing temperature detecting system of claim 1, wherein each of the leads is provided with a fixing clip for fixing the lead in the machine assembly.

5. The bushing temperature detecting system of claim 1, wherein the process connecting bolt is connected to a process interface on the machine assembly.

* * * * *